United States Patent
Albaisa et al.

(10) Patent No.: US 6,769,728 B2
(45) Date of Patent: Aug. 3, 2004

(54) POP-UP ROOF RACK

(75) Inventors: Alfonso E. Albaisa, Chula Vista, CA (US); John Cupit, Cordiff By The Sea, CA (US)

(73) Assignee: Nissan Design America, Inc., San Diego, CA (US)

( * ) Notice: Subject to any disclaimer, the term of this patent is extended or adjusted under 35 U.S.C. 154(b) by 0 days.

(21) Appl. No.: 10/322,794

(22) Filed: Dec. 19, 2002

(65) Prior Publication Data

US 2003/0141735 A1 Jul. 31, 2003

Related U.S. Application Data

(60) Provisional application No. 60/344,342, filed on Jan. 4, 2002.

(51) Int. Cl.[7] .............................................. B60R 9/045
(52) U.S. Cl. ...................... 296/37.7; 296/3; 296/210; 224/309; 224/321
(58) Field of Search .................... 296/3, 37.7, 210, 296/37.6, 37.1, 26.04, 26.06, 26.07; 224/309, 321, 314, 325, 326

(56) References Cited

U.S. PATENT DOCUMENTS

| | | | | | |
|---|---|---|---|---|---|
| 5,016,858 A | * | 5/1991 | Mitchell | ....................... | 296/3 |
| 5,110,021 A | * | 5/1992 | Dawson, Jr. | ................... | 296/3 |
| 5,143,415 A | * | 9/1992 | Boudah | ......................... | 296/3 |
| 5,226,569 A | * | 7/1993 | Watjer et al. | .............. | 296/37.7 |
| 5,511,709 A | * | 4/1996 | Fisch | ......................... | 224/321 |
| 5,749,436 A | * | 5/1998 | Satchwell, Jr. | ................. | 296/3 |
| 6,029,873 A | * | 2/2000 | Won et al. | .................. | 224/321 |
| 6,126,220 A | * | 10/2000 | Brasher | .................. | 296/26.04 |
| 6,260,751 B1 | * | 7/2001 | Heiler | ........................ | 224/321 |
| 6,286,739 B1 | * | 9/2001 | Stapleton | .................... | 224/321 |
| 6,332,637 B1 | * | 12/2001 | Chambers | ..................... | 296/3 |

OTHER PUBLICATIONS

"Vehicles from Sweden Make World Premier", North American International Auto Show, Show Talk 2002, vol.14, Issue 4, Dec. 2001, pp. 1–3.

* cited by examiner

Primary Examiner—D. Glenn Dayoan
Assistant Examiner—Greg Blankenship
(74) Attorney, Agent, or Firm—Foley & Lardner LLP

(57) ABSTRACT

A vehicle cargo rack is provided with a carrier member and a carrier positioning device for positioning the carrier member. The carrier member is positionable in at least a deployed position and a stored position.

10 Claims, 2 Drawing Sheets

US 6,769,728 B2

POP-UP ROOF RACK

CORRESPONDING RELATED APPLICATIONS

The Applicants claim the benefit of and priority to U.S. Provisional Patent Application No. 60/344,342 filed on Jan. 4, 2002, the entire contents of which are incorporated by reference herein in its entirety.

BACKGROUND OF THE INVENTION

A. Field of the Invention

The invention relates generally to vehicle cargo racks, more particularly, to pop-up roof racks being positionable in a deployed position and a stored position.

B. Detailed Description of the Related Art

Vehicle cargo racks are commonly used to provide additional storage capacity for items such as bicycles, skis, cargo boxes, kayaks, and the like. The rising popularity of cargo racks has led some original equipment manufacturers (OEM) to offer permanently fixed and increasingly versatile roof racks.

SUMMARY OF THE INVENTION

According to one embodiment of the present invention, a vehicle cargo rack is provided comprising a first carrier member, the first carrier member being positionable in at least a deployed position and a stored position, and a first carrier positioning device for positioning the first carrier member.

According to another embodiment of the present invention, a method of deploying a vehicle cargo rack between a deployed position and a stored position is provided, comprising the steps of positioning a carrier member in a deployed position, and positioning the carrier member in a stored position, wherein the positioning steps are performed by a carrier positioning device.

According to another embodiment of the present invention an integral vehicle cargo rack is provided, comprising a plurality of retractable members, wherein the plurality of retractable members are positionable in an elevated position relative to an external surface of the vehicle and a retracted position flush with the external surface of the vehicle.

DETAILED DESCRIPTION OF THE PREFERRED EMBODIMENTS

Reference will now be made in detail to presently preferred embodiments of the invention. Wherever possible, the same reference numbers will be used throughout the drawings to refer to the same or like parts.

Conventional roof racks suffer from many problems. As noted, many vehicle roof racks are permanently fixed. Often these permanently fixed roof racks are bulky and somewhat unsightly, which can detract from the aesthetics of the vehicle and increase the wind resistance of the roof-line and may cause wind-induced noise. Moreover, some roof racks can be damaged and difficult to clean when passing through automatic car washes and the like (e.g., similar to large spoilers and powered antennas), which can restrict a car owner's ability to wash and wax his or her car.

Removable roof racks, especially commonly available aftermarket add-ons, also suffer from many problems. While removable roof racks can be taken off, they are often difficult to install and remove. Often, several straps, hooks, snaps, clamps and other fasteners are used to securely fasten the roof rack to the vehicle, which may take considerable time to set up and may be difficult for an individual to perform alone. Furthermore, fasteners can scratch, dent, or otherwise damage the underlying paint or body panel, which can lead to accelerated corrosion, and generally detracts from the vehicle's appearance.

Thus, a need exists for a vehicle cargo rack that is positionable in a deployed position and a stored position without having to be removed from the vehicle. It should be appreciated that while the present disclosure refers to a "roof" rack, the present invention is also applicable to a "trunk" rack, etc.

Figure 4:
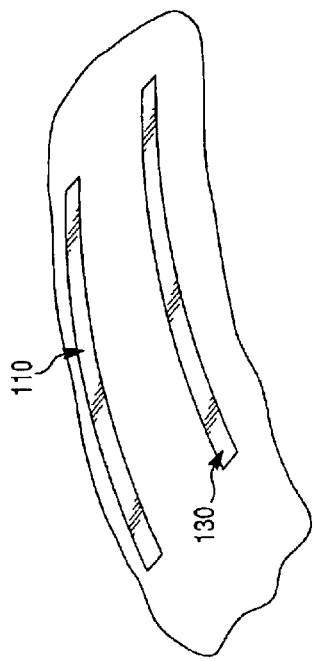
FIG. 4 is a perspective view of a vehicle cargo rack in a stored position according to an embodiment of the present invention.
Figure 1:
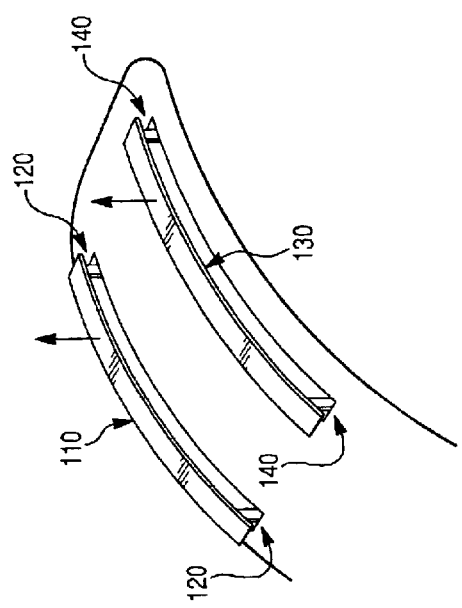
FIG. 1 is a perspective view of a vehicle cargo rack according to an embodiment of the present invention.

A vehicle cargo rack according to a first embodiment of the present invention is shown in the perspective view of FIG. 1. According to this first embodiment, a vehicle cargo rack comprises a first carrier member 110 and one or more first support member(s) 120 positioned substantially perpendicular to the first carrier member 110. Preferably, the first carrier member 110 comprises an elongated and substantially rectangular panel. The vehicle cargo rack further comprises a second carrier member 130 positioned substantially parallel to the first carrier member 110, and one or more second support member(s) 140 positioned substantially perpendicular to the second carrier member 130. The first carrier member 110 and second carrier member 130 are positionable in a deployed position as shown in FIG. 1, and in a stored position as shown in FIG. 4. Preferably, the first carrier member 110 and second carrier member 130 are substantially flush with an exterior surface of the vehicle when in the stored position as shown in FIG. 4.

Figure 3:
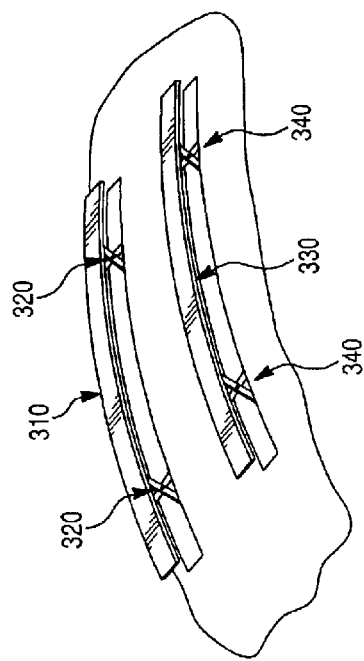
FIG. 3 is a perspective view of a vehicle cargo rack with a scissor hinged support member according to an embodiment of the present invention.
Figure 2:
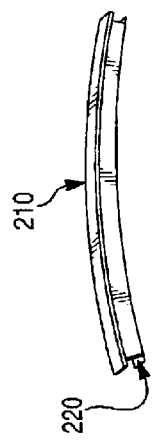
FIG. 2 is a perspective view of a carrier member and a support member according to an embodiment of the present invention.
Figure 5:
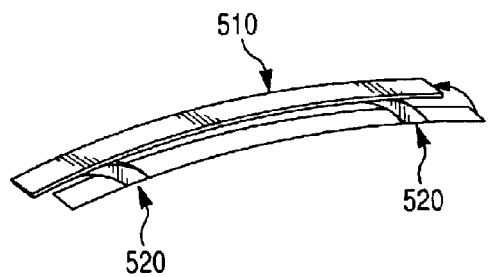
FIG. 5 is a perspective view of a vehicle cargo rack with an angled support member according to an embodiment of the present invention.

As shown in FIG. 5, a carrier member 510 may be supported by one or more rotatable angular support member(s) 520, though many other configurations are also possible. Thus, a vertical bar (i.e., one plausible support member) should be interpreted as including an individual, relatively small diameter bar (e.g., FIG. 1), or an elongated member (e.g., FIG. 2). Alternatively, the support member may comprise a plurality of individual bars (not shown) positioned substantially perpendicular to the carrier member. Moreover, as shown in FIG. 3, a first carrier member 310 may be supported by one or more scissor hinges 320 (e.g., "X" shaped or "Y" shaped scissor hinges). Similarly, a second carrier member 330 may be supported by one or more scissor hinges 340. Furthermore, as shown in FIG. 5, a carrier member 510 may be supported by a rotatable angular support member 520, such that carrier member 510 angularly retracts from the deployed position to the stored position. As would be readily apparent to one skilled in the art after reading this disclosure, many other configurations are also possible and are within the scope of the invention.

A vehicle cargo rack according to this first embodiment is positionable in a deployed position (i.e., FIG. 1) and a stored position (i.e., FIG. 4) without having to be removed from the vehicle. An electric motor (not shown) or other suitable positioning device (e.g., manual, positioning assembly such as a ratcheting assembly, etc.) can be provided to position the first carrier member 110 and second carrier member 130 without requiring the vehicle operator to install or remove the vehicle cargo rack. Alternatively a "touch-and-pop" mechanism can be used to position the first carrier member 110 and second carrier member 130, in which, when the first carrier member 110 and second carrier member 130 are in the stored position, they can be positioned to the deployed position by lightly pushing down first carrier member 110 and second carrier member 130 and then releasing. A spring or other similar device in the touch-and-pop mechanism then pushes the first carrier member 110 and second carrier member 130 into the deployed position. Thus, a vehicle cargo rack according to this first embodiment can be deployed at the push of a button within the vehicle itself, or by requiring a minimal amount of user configuration.

Figure 6:
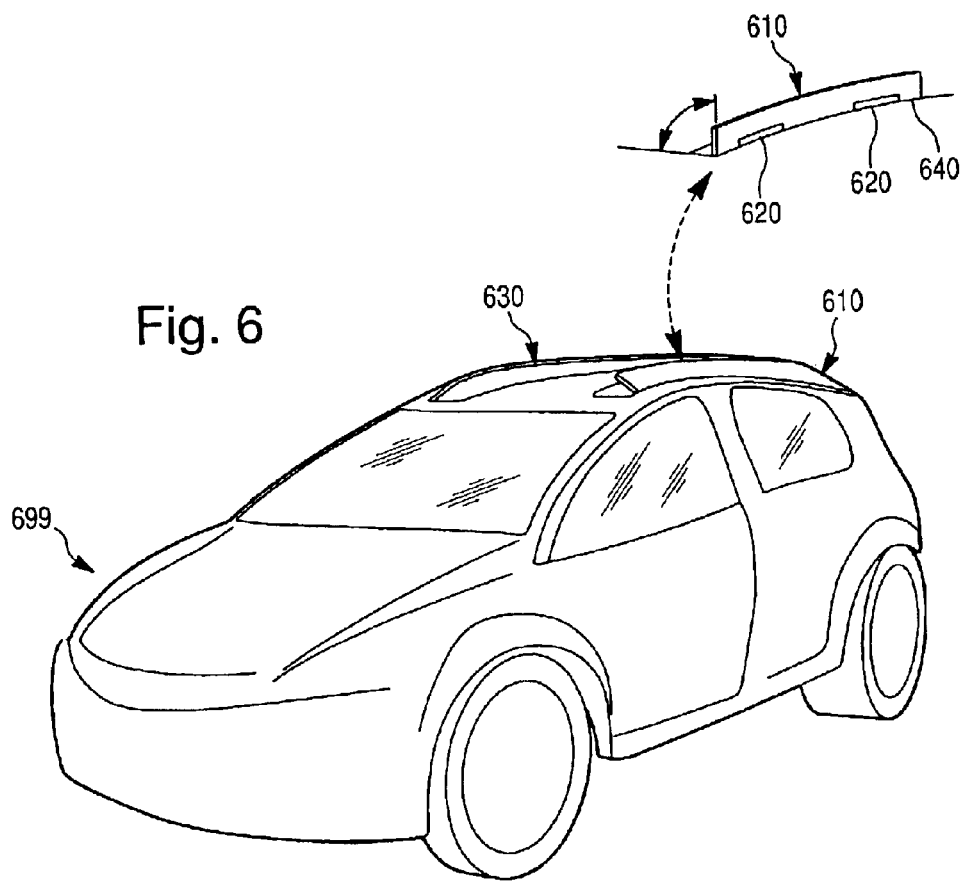
FIG. 6 is a perspective view of a vehicle cargo rack with side hinged carrier members according to an embodiment of the present invention.

A vehicle cargo rack according to a second embodiment of the present invention is shown in the perspective view of FIG. 6. According to this second embodiment, a vehicle cargo rack comprises a first carrier member 610, and a second carrier member 630 positioned substantially parallel to the first carrier member 610. The first carrier member 610 (and similarly the second carrier member 630) can be hinged to an exterior surface of the vehicle 699 via hinges 620 along a side portion 640 of the first carrier member 610. The first carrier member 610 and second carrier member 630 are positionable in a deployed position as shown in FIG. 6, and in a stored position as similarly shown in FIG. 4 with respect to a first embodiment of the present invention.

A vehicle cargo rack according to this second embodiment has all of the aforementioned advantages of the first embodiment, and further provides a vehicle manufacturer with additional options to choose from when designing a new vehicle.

A vehicle cargo rack according to any one of the aforementioned embodiments can be provided with many different devices and configurations for retaining various items as would be readily apparent to one skilled in the art after reading this disclosure. Thus, by way of example, a vehicle cargo rack may include holes, snaps, loop ties, clamps, tie downs, hooks, and other fastening means on the carrier member if desired. Further, cross-bar members can be provided to provide additional support or fastening areas if desired. Cross-bar members may be integrated with the carrier members, such that they are positioned in the deployed and stored positions alongside the carrier members. Alternatively, cross-bar members may be provided as separate components that are manually attached to the carrier members when positioned in a deployed position. As would be readily apparent to one skilled in the art, cross-bar members are not necessary for many applications, such as self-supporting rectangular cargo holds, which include cross support members internally.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application and to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle cargo rack, comprising:
   a first carrier member, said first carrier member being positionable in at least a deployed position and a stored position; and
   a first carrier positioning device for positioning said first carrier member,
   wherein said first carrier member is substantially flush with an exterior surface of said vehicle when in said stored position,
   wherein said first carrier member is substantially parallel to said exterior surface of said vehicle when in said deployed position,
   wherein said first carrier positioning device comprises at least one support member positionable substantially perpendicular to said first carrier member, and
   wherein said at least one support member comprises a scissor hinge.

2. The vehicle cargo rack according to claim 1, further comprising:
   a second carrier member positioned substantially parallel to said first carrier member, said second carrier member being positionable in said deployed position and said stored position; and
   a second carrier positioning device for positioning said second carrier member.

3. The vehicle cargo rack according to claim 1, wherein said vehicle cargo rack is a roof mounted cargo rack.

4. A vehicle cargo rack comprising:
   a first carrier member, said first carrier member being positionable in at least a deployed position and a stored position; and
   a first carrier positioning device for positioning said first carrier member,
   wherein said first carrier member is substantially flush with an exterior surface of said vehicle when in said stored position,
   wherein said first carrier member is angled with respect to said exterior surface of said vehicle when in said deployed position,
   wherein said first carrier member comprises an elongated panel, and wherein said first carrier member is hinged to said exterior surface of said vehicle along a side portion of said elongated panel.

5. A vehicle cargo rack, comprising:
   a first carrier member, said first carrier member being positionable in at least a deployed position and a stored position; and
   a first carrier positioning device for positioning said first carrier member,
   wherein said first carrier positioning device comprises a touch and pop mechanism for positioning said first carrier member.

6. A method of deploying a vehicle cargo rack between a deployed position and a stored position, comprising the steps of:
   positioning a carrier member in a deployed position by vertically elevating said carrier member from said stored position to said deployed position; and
   positioning the carrier member in a stored position, wherein the positioning steps are performed by a carrier positioning device, wherein said carrier member is substantially flush with an exterior surface of said vehicle when in said stored position, wherein said carrier member is substantially parallel to said exterior surface of said vehicle when in said deployed position, and wherein vertically elevating said carrier member comprises extending a scissor hinge attached to an underside of said carrier member.

7. A method of deploying a vehicle cargo rack between a deployed position and a stored position, comprising the steps of:

positioning a carrier member in a deployed position by rotating said carrier member from said stored position to said deployed position, said carrier member being hinged along an elongated side portion; and positioning the carrier member in a stored position, wherein the positioning steps are performed by a carrier positioning device, and wherein said first carrier member is substantially flush with an exterior surface of said vehicle when in said stored position.

8. An integral vehicle cargo rack, comprising:

a plurality of retractable members, wherein said plurality of retractable members are positionable in an elevated position relative to an external surface of a vehicle and a retracted position flush with said external surface of said vehicle; and a plurality of scissor hinges extendably connecting said plurality of retractable members to said vehicle.

9. A vehicle cargo rack, comprising:

a first carrier member, said first carrier member being positionable in at least a deployed position and a stored position; and a first carrier positioning device for positioning said first carrier member, wherein said first carrier member is angled with respect to a roof of a vehicle when in said deployed position, wherein said first carrier member comprises an elongated panel, and wherein said first carrier member is hinged to said roof of said vehicle along a portion of said elongated panel.

10. The vehicle cargo rack according to claim 9, wherein said first carrier member comprises fasteners for retaining various items to said cargo rack.

* * * * *